United States Patent
Erbes et al.

(10) Patent No.: US 8,520,794 B2
(45) Date of Patent: Aug. 27, 2013

(54) METHOD AND DEVICE FOR FACILITATING A UNIFORM LOADING CONDITION FOR A PLURALITY OF SUPPORT MEMBERS SUPPORTING A STEAM DRYER IN A NUCLEAR REACTOR

(75) Inventors: John Eddes Erbes, Mountain View, CA (US); Christopher Martin Welsh, Livermore, CA (US)

(73) Assignee: General Electric Company, Schenectady, NY (US)

( * ) Notice: Subject to any disclaimer, the term of this patent is extended or adjusted under 35 U.S.C. 154(b) by 1239 days.

(21) Appl. No.: 11/153,342

(22) Filed: Jun. 16, 2005

(65) Prior Publication Data

US 2006/0285625 A1 Dec. 21, 2006

(51) Int. Cl.
*G21D 1/02* (2006.01)

(52) U.S. Cl.
USPC .......................................... 376/260

(58) Field of Classification Search
USPC ............... 33/802; 248/651; 108/7; 81/301; 254/303; 384/8; 376/260, 258, 708, 371; 280/6.153, 6.157, 5.514
See application file for complete search history.

(56) References Cited

U.S. PATENT DOCUMENTS

| | | | | | |
|---|---|---|---|---|---|
| 2,548,784 | A | * | 4/1951 | Hansen | 60/560 |
| 3,559,936 | A | * | 2/1971 | Guyon | 434/58 |
| 3,771,499 | A | * | 11/1973 | Marroni et al. | 122/510 |
| 4,076,214 | A | * | 2/1978 | Colly | 254/93 R |
| 4,104,877 | A | * | 8/1978 | Bone et al. | 60/230 |
| 4,286,549 | A | * | 9/1981 | Eisinger | 122/510 |
| 4,428,329 | A | * | 1/1984 | Rees | 122/510 |
| 4,566,199 | A | * | 1/1986 | Gruhler et al. | 33/784 |
| 4,581,199 | A | * | 4/1986 | Bioret et al. | 376/285 |
| 4,587,773 | A | * | 5/1986 | Valencia | 52/1 |
| 4,940,025 | A | * | 7/1990 | Ott et al. | 122/510 |
| 4,957,021 | A | * | 9/1990 | Helton | 81/57.44 |
| 5,046,290 | A | * | 9/1991 | Ishit et al. | 52/1 |
| 5,201,112 | A | * | 4/1993 | Sevelinge | 29/705 |
| 5,219,429 | A | * | 6/1993 | Shelton | 254/423 |
| 5,278,880 | A | * | 1/1994 | Baker et al. | 376/285 |
| 5,319,689 | A | * | 6/1994 | Challberg | 376/371 |
| 5,321,731 | A | * | 6/1994 | Oosterkamp | 376/371 |
| 5,379,331 | A | * | 1/1995 | Brouttelande | 376/285 |
| 5,566,216 | A | * | 10/1996 | Ly | 376/258 |
| 5,600,687 | A | * | 2/1997 | Welsh | 376/260 |
| 5,651,334 | A | * | 7/1997 | Stirzel et al. | 122/510 |
| 5,864,595 | A | * | 1/1999 | Burrows et al. | 376/260 |

(Continued)

OTHER PUBLICATIONS

Catalog Hi-Force, p. 48; www.hi-force.com.*

(Continued)

*Primary Examiner* — Jack W Keith
*Assistant Examiner* — Sean P Burke
(74) *Attorney, Agent, or Firm* — Harness, Dickey & Pierce (57) ABSTRACT

In a method and device for facilitating a uniform loading condition for a plurality of support members supporting a steam dryer in a nuclear reactor, the device may include at least one or more actuators. Each actuator may be provided between a corresponding support member and a lower bearing surface of a portion of the dryer for lifting its corresponding dryer portion lower bearing surface relative to the support member. The device may include at least one or more measurement units. Each measurement unit may correspond to a given support member for measuring a displacement value between the corresponding support member and the lower bearing surface of its corresponding dryer portion.

14 Claims, 6 Drawing Sheets

(56) References Cited

U.S. PATENT DOCUMENTS

| | | | |
|---|---|---|---|
| 6,000,260 A * | 12/1999 | Price et al. | 72/17.2 |
| 6,223,136 B1 * | 4/2001 | Geiger | 702/158 |
| 6,311,952 B2 * | 11/2001 | Bainter | 254/89 H |
| 6,768,936 B2 * | 7/2004 | Fiorletta et al. | 701/37 |
| 7,066,474 B2 * | 6/2006 | Hiebert et al. | 280/6.153 |
| 2007/0153964 A1 * | 7/2007 | Erbes et al. | 376/371 |

OTHER PUBLICATIONS

"Buffalo Hydraulic" catalog; 22004, Buffalo, NY(Buffalohydraulic).*

"Buffalo Hydraulic" catalog; 22004, Buffalo, NY (product_400_Hydraulic).*

"Buffalo Hydraulic" catalog; 22004, Buffalo, NY(BHlifting).*

* cited by examiner

METHOD AND DEVICE FOR FACILITATING A UNIFORM LOADING CONDITION FOR A PLURALITY OF SUPPORT MEMBERS SUPPORTING A STEAM DRYER IN A NUCLEAR REACTOR

BACKGROUND OF THE INVENTION

1. Field of the Invention

This present invention relates generally to a method and device for facilitating a uniform loading condition for a plurality of support members supporting a steam dryer in a nuclear reactor.

2. Description of the Related Art

A reactor pressure vessel (RPV) of a nuclear reactor such as a boiling water reactor (BWR) typically has a generally cylindrical shape and is closed at both ends, e.g., by a bottom head and a removable top head. A top guide typically is spaced above a core plate within the RPV. A core shroud, or shroud, typically surrounds the reactor core and is supported by a shroud support structure. The shroud has a generally cylindrical shape and surrounds both the core plate and the top guide. There is a space or annulus located between the cylindrical reactor pressure vessel and the cylindrically-shaped shroud.

Heat is generated within the core and water circulated up through the core is at least partially converted to steam. Steam separators separate the steam and the water. Residual water is removed from the steam by steam dryers located above the core. The de-watered steam exits the RPV through a steam outlet near the vessel top head.

Conventional BWR design steam dryers may exhibit vibratory motion during operation, which manifests itself as unusual wear or in some cases cracking on upper bearing surfaces of steam dryer support brackets which support to steam dryer within the RPV. The wear and cracking may suggest that the dryer is rocking due to uneven contact with its support brackets.

Figure 1:
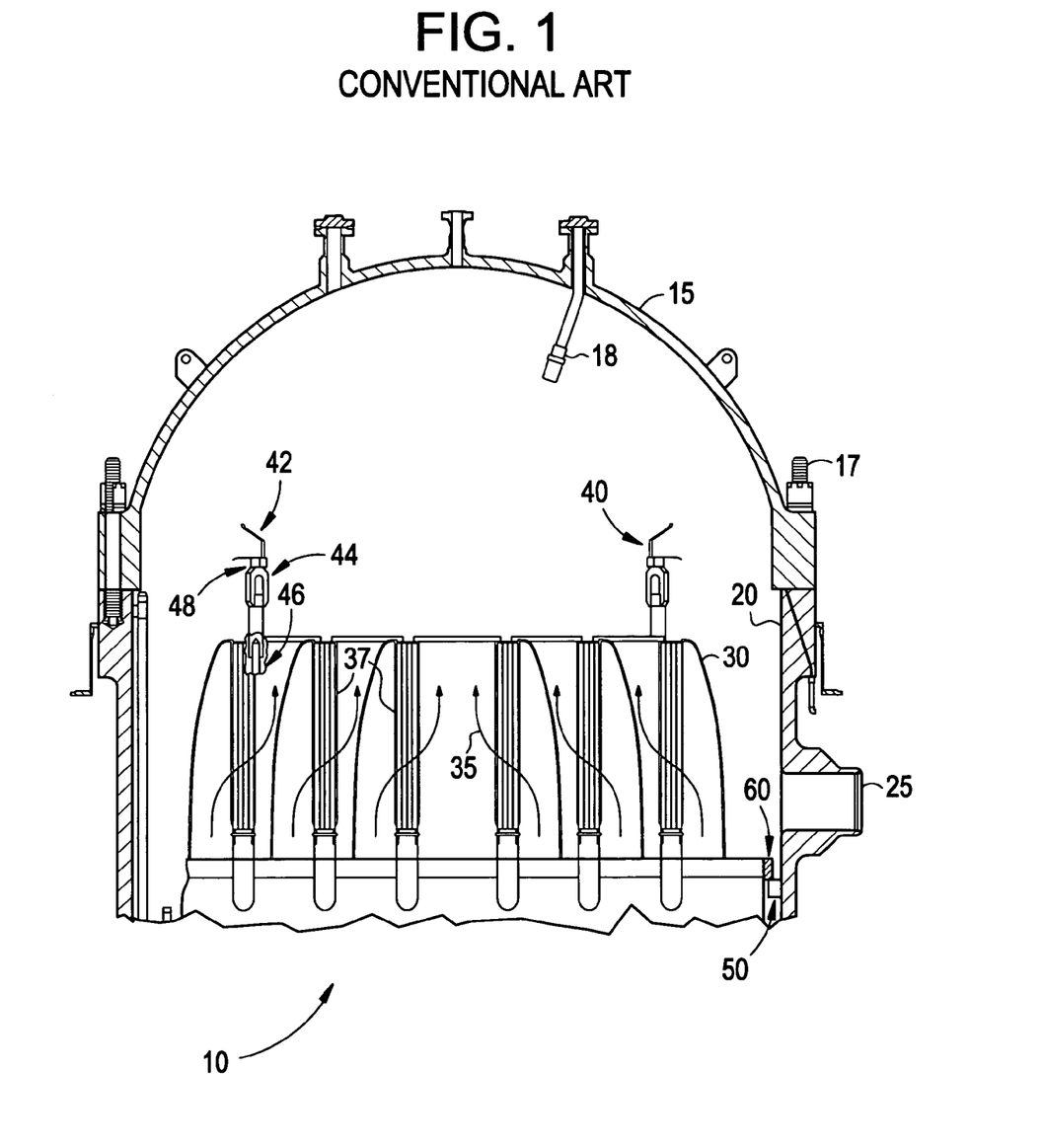
FIG. 1 illustrates an upper portion of a conventional RPV of a BWR to illustrate a steam dryer arrangement within the RPV.

FIG. 1 illustrates an upper portion of a conventional RPV of a BWR to illustrate a steam dryer arrangement within the RPV. Referring to FIG. 1, there is illustrated an RPV 10 with top head 15 secured to the RPV 10 via main closure head bolts 17. Some of the components within the RPV 10 of the conventional BWR have been removed for clarity, although FIG. 1 illustrates the head spray nozzle 18 penetrating the top head 15, a conventional steam dryer 30 for removing residual water entrained in steam exiting the steam separators (not shown), a steam dryer hold down assembly 40, and the steam outlet nozzle 25, which carries the de-watered steam exiting the steam dryer 30 out of the RPV 10 to power turbine generators and associated downstream electrical distribution systems. Residual water or condensate removed from the steam-water mix 35 exiting the steam dryers is returned to the reactor via drain channels 37 in the steam dryer 30.

The steam dryer hold down assembly 40 may include a plurality of RPV steam dryer hold down brackets 42 connected to the dryer 30 via a corresponding steam dryer lifting rod eye 44 to steam dryer lifting rod 46. A typical steam dryer hold down assembly for conventional BWR steam dryers 30 may include four RPV steam dryer hold down brackets 42 attached to the inside of the top head 15 of the RPV 10. During reactor construction, the corresponding steam dryer lifting rod eyes 44 were typically adjusted so that their upper surfaces had from about one-half inch to one inch clearance to the bottom surface of the steam dryer hold down brackets 42, as shown generally by element number 48 in FIG. 1. This clearance gap 48 was provided to allow for differential thermal expansion between the RPV 10 and the steam dryer lifting rod 46. The dryer hold down assembly 40 was intended to function only during a steam line break accident (i.e., loss-of-coolant accident (LOCA)), where the dryer 30 lifts completely off of its support brackets 50, which support dryer support ring 60 attached to the steam dryer 30. Thus, the dryer hold down assembly 40 is not effective as a stabilizing support to prevent the vibratory motion of the steam dryer 30 during normal operation.

Also, there is concern that operating reactor plants implementing uprated power operations (power operations in excess of rated power output) may be more susceptible to this vibratory motion, due to increased steam flow and pressure drop across the dryer 30. As a result, dryer rocking tests are being recommended in conjunction with power uprates, even if a given, evaluated plant has not previously experienced this problem.

There may be an additional concern in a plant where the steam dryer is to be replaced due to damage in service. Here, an effective means of establishing uniform support for the steam dryer in the fit-up of a new steam dryer may be desired.

Conventionally, where uneven contact with the support brackets 50 is observed, a steam dryer rocking test is used to evaluate required corrective action. The amount and location of the non-uniformity at the interfaces which support the dryer 30 and the dryer support ring 60 between the respective mating steam dryer support brackets 50 which are attached to the RPV upper shell 20 is determined by test. The test is performed by inducing rocking of the dryer 30, first about a "north/south" or first axis, then an "east/west" or second axis. This test was performed by inserting a shim in one support bracket 50 location, and applying a tipping weight on the top of the dryer 30 at one eccentrically positioned location, then the diagonally opposite location. The amount of tipping is measured using dial indicators that record the relative movement of the tops of the dryer lifting rods.

This testing procedure is repeated with the shim and weight positions relocated (about 90 degrees) to the next axis. As the measured values include effects of sagging due to dryer 30 flexibility and non-uniform spacing of the support brackets 50, the needed adjustments must be approximated by complex indirect calculations. If required, adjustment is typically made by grinding the bottom of one or more dryer support ring 60 contact or bearing surfaces. As no further reactor maintenance can be performed within the RPV until the dryer is removed, reducing the critical path duration required for dryer support measurements is highly desirable.

SUMMARY OF THE INVENTION

An example embodiment of the present invention is directed to a device for facilitating a uniform loading condition for a plurality of support members supporting a steam dryer in a nuclear reactor. The device may include at least one or more actuators. Each actuator may be provided between a corresponding support member and a lower bearing surface of a portion of the dryer for lifting its corresponding dryer portion lower bearing surface relative to the support member. The device may include at least one or more measurement units. Each measurement unit may correspond to a given support member for measuring a displacement value between the corresponding support member and the lower bearing surface of its corresponding dryer portion.

Another example embodiment of the present invention is directed to a lifting and measuring assembly connected to a plurality of support brackets supporting a steam dryer within a reactor pressure vessel (RPV) of a nuclear reactor. The assembly may be configured for facilitating a uniform loading of the steam dryer on the support brackets based on measuring displacement values between the support brackets and corresponding dryer support ring contacts of the steam dryer.

Another example embodiment of the present invention is directed to a method for facilitating a uniform loading condition for a plurality of support members supporting a steam dryer in a nuclear reactor. In the method, a vertical displacement may be measured between each of the support members and a corresponding lower bearing surface of a portion of the dryer. Based on the measured displacements, one or more of the lower bearing surfaces of the dryer portions may be adjusted so as to achieve a substantially uniform loading of the dryer on the plurality of support members.

Another example embodiment of the present invention is directed to a method for facilitating a uniform loading condition for a plurality of support brackets supporting a steam dryer within a nuclear reactor. In the method, an equal positive pressure may be applied to a plurality of lifting and measuring assemblies. Each lifting and measuring assembly may be attached between a given support bracket and its corresponding support ring contact or bearing surface of the dryer, so as to lift the support ring at a plurality of contact locations. A vertical displacement may be measured between each of the support members and a corresponding lower bearing surface of the lifted support ring resulting from the applied pressure. Based on the measured displacements, material may be removed from one or more lower bearing surfaces of the support ring so as to achieve a substantially uniform loading of the dryer on the plurality of support brackets.

BRIEF DESCRIPTION OF THE DRAWINGS

Example embodiments of the present invention will become more fully understood from the detailed description given herein below and the accompanying drawings, wherein like elements are represented by like reference numerals, which are given by way of illustration only and thus are not limitative of the present invention.

DETAILED DESCRIPTION OF THE EXAMPLE EMBODIMENTS

Example embodiments of the present invention as will be described in further detail hereafter are directed to a device and method for evaluating loading conditions on support brackets supporting a steam dryer so as to make desired adjustments in an effort to provide uniform contact of the steam dryer on the dryer support brackets. The support brackets may be spaced circumferentially around the steam dryer to connectedly support a corresponding portion of the steam dryer assembly, such as a dryer support ring, for example, to the upper shell of a reactor pressure vessel (RPV) enclosing the steam dryer. In general, the example device and methodology may employ an actuator, clamp feature, contact plate and measurement unit (hereafter occasionally also referred to collectively referred to as a "lifting and measuring assembly") placed in the interface between each of the dryer support bracket contact locations with a portion of the steam dryer.

The dryer may be momentarily lifted out of the RPV to allow insertion of the device between a lower bearing surface of a dryer support ring and an upper planar surface of the dryer support bracket. As will be seen in more detail below, the actuators may be connected by a common manifold to produce uniform load at all contact locations and are simultaneously pressurized to lift the dryer. A measured displacement of the dryer at each contact location may be used to determine adjustments to lower bearing surfaces of the support ring so as to achieve a substantially uniform loading condition across all support brackets. This lifting and measurement process allows determination of required contact adjustments in one step, to minimize the duration of measurement work required in the RPV. As no further reactor maintenance can be performed within the RPV until the dryer is removed, reducing the critical path duration required for dryer support measurements is highly desirable. Corrective machining at the dryer contact locations (lower bearing surfaces of the support ring) to obtain the desired uniform seating may be performed with the dryer located in the equipment storage pool external to the RPV, so as not to interfere with other outage critical path maintenance.

Steam dryers do not lift under static normal operating pressure differential. Only a few steam dryers have experienced unusual steam dryer support bracket wear or cracking. Therefore, relatively accurate adjustments in an effort to obtain substantially uniform support bracket seating may potentially significantly reduce and/or eliminate the tendency of a dryer to rock due to the occurrence of flow-induced vibrations, which may occur during normal power operations within the RPV.

As discussed above, FIG. 1 illustrates a steam dryer 30 arrangement with a conventional means of support. The dryer 30 weight is supported at the bottom of the dryer 30 by the seating of corresponding support ring 60 on a plurality of support brackets 50 attached to the RPV upper shell 20. The four steam dryer lifting rods 46 are used as an accident condition hold down device for the steam dryer 30. Upward displacement of the steam dryer lifting rods 46 is limited by the four hold down brackets 42 attached to the inside of the top head 15 of the RPV 10. As these brackets 42 have from about one-half inch to one inch clearance to the lifting rod eyes 44, the brackets 42 are not beneficial in restraining operational motions that may occur due to dryer 30 rocking.

Figure 2A:
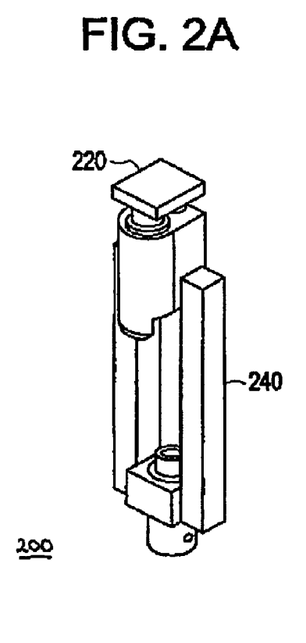
FIG. 2A illustrates a perspective view of a device for a uniform loading condition for a plurality of support members supporting a steam dryer in a nuclear reactor, in accordance with an example embodiment of the present invention.
Figure 2B:
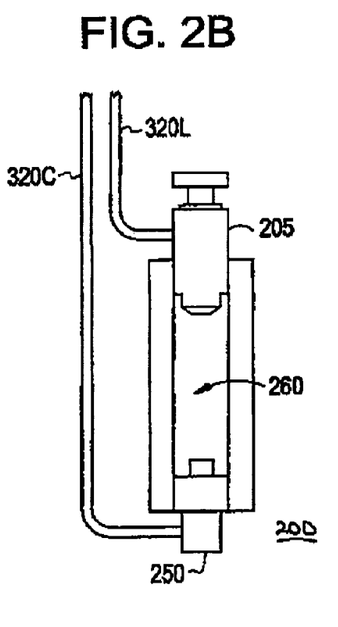
FIG. 2B is a front view of the device in FIG. 2A as viewed from the steam dryer toward the RPV upper shell.

FIG. 2A illustrates a perspective view of a device for facilitating a uniform loading condition for a plurality of support members supporting a steam dryer in a nuclear reactor, in accordance with an example embodiment of the present invention; FIG. 2B is a front view of the device in FIG. 2A as viewed from the steam dryer toward the RPV upper shell; and FIG. 2C is a side view of the device in FIG. 2A as viewed along the RPV upper shell.

Figure 2C:
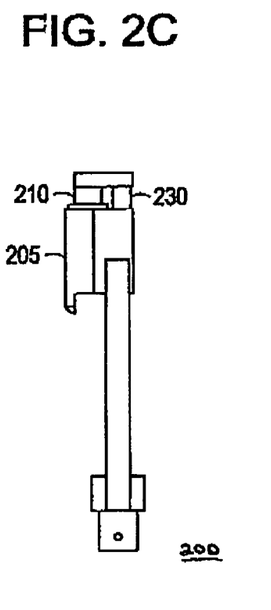
FIG. 2C is a side view of the device in FIG. 2A as viewed along the RPV upper shell.

As shown in FIGS. 2A-2C, the device 200 (also occasionally referred to as a 'lifting and measuring assembly') may include a device housing 205 containing an actuator 210 that is attached to a contact plate 220. Housing 205 may also include a measurement unit 230 attached to the contact plate 220. The actuator 210 may be embodied as a hydraulic lifting cylinder, but any hydraulic mechanism which includes a moveable piston and is moveable under an applied pressure may be used for actuator 210. A feature of the system is the use of multiple identical actuators at the respective bracket locations, such that with equal piston areas and equal hydraulic pressures from a common supply manifold, equal lifting force is exerted simultaneously at all support locations. Hydraulic fluid is used to supply the lifting pressure, as opposed to air, to avoid inconsistent lifting which could result from compressibility.

The measurement unit 230 may be a displacement transducer assembly, although a transducer is merely one example measurement unit 230; it is evident to one of ordinary skill in the art that the measurement unit 230 could be embodied by any device which is configured so as to measure a vertical displacement distance between the steam dryer support bracket 50 and a lower bearing surface of a corresponding dryer support ring 60. The vertical displacement measured by the measurement unit 230 may be read out and recorded remotely on the refuel floor, so as to determine adjustments to be made to one or more of the support ring 60 lower bearing surfaces in an effort to achieve uniform loading of the steam dryer 30 on the plurality of support brackets 50.

As shown best in FIG. 2B, the device housing 205 which supports the actuator 210, contact plate 220 and measurement unit 230 may be connected to a pair of clamp arms 240. The clamp arms 240 may extend downward from the device housing 205, with the arms terminating at a clamping cylinder 250. An opening 260 may be provided between the clamping arms 240 to receive a corresponding support bracket 50.

Figure 3:
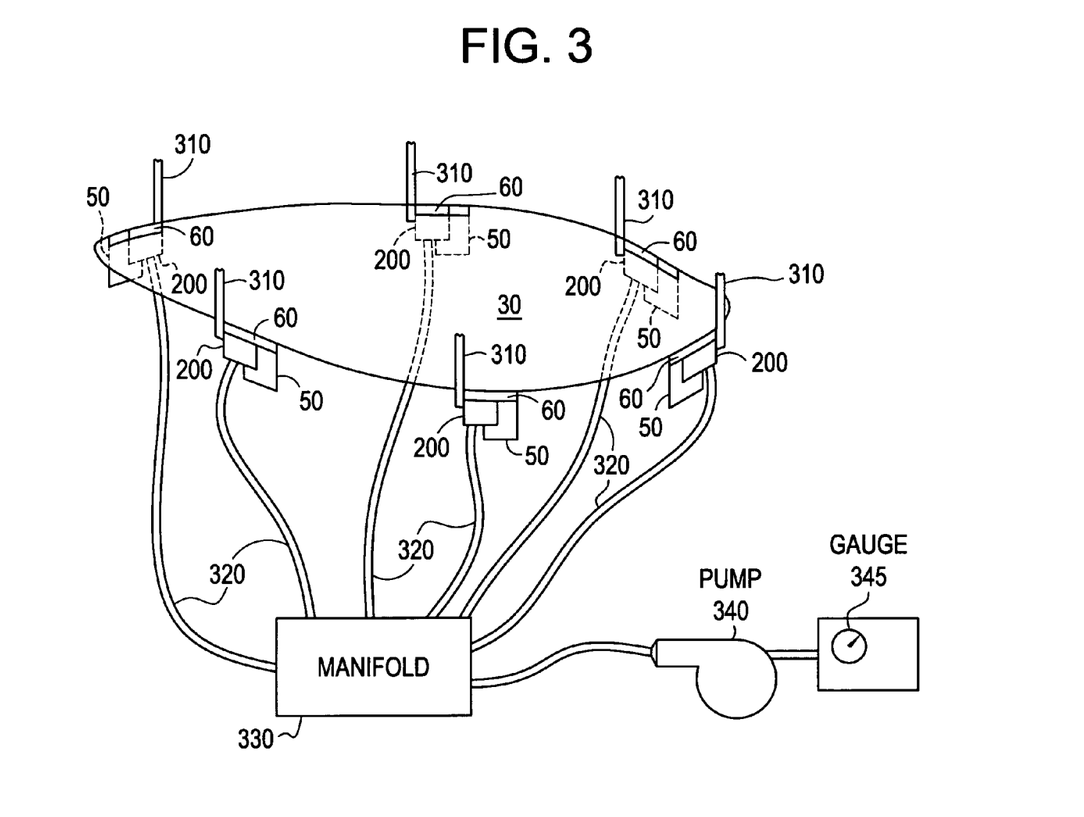
FIG. 3 is a block diagram illustrating a system for providing a positive pressure to the device in FIGS. 2A-2C for measuring vertical displacements between support brackets and lower bearing surfaces of the support ring, in accordance with an example embodiment of the present invention.

FIG. 3 is a block diagram illustrating a system for providing positive hydraulic pressure to the devices 200 shown in FIGS. 2A-2C, both for clamping the actuators in place, and for measuring vertical displacements between support brackets 50 and lower bearing surfaces 62 (show in FIG. 5B) of the support ring 60, in accordance with an example embodiment of the present invention. The block diagram of FIG. 3 shows only a general relationship between the devices 200 at interfaces between a given support bracket 50 and support ring 60 of the steam dryer 30, and the sources of pressure. While only one actuator hydraulic supply system is indicated for clarity, there may be two separate actuator hydraulic supplies, for clamping cylinder 250 and lifting cylinder 210 (both shown in FIG. 5A). For example, and with reference to FIG. 2B, the hydraulic supply for lifting applies pressure through supply line 320L. The separate hydraulic supply for clamping is the same, but each clamp supply line 320C may include an individual shutoff valve at the manifold to facilitate clamping of each device 200 in place as it is positioned on the corresponding support bracket 50.

As shown in the block diagram of FIG. 3, a device 200 (lifting and measuring assembly) may be installed at each support bracket 50 location in the RPV 10. In an example, there may be at least N support brackets 50 attached to RPV upper shell 20 for supporting the steam dryer 30 within the upper shell 20 of the RPV 10, where N may be greater than or equal to 4. A given lifting and measuring assembly or device 200 may be therefore installed at each of N support bracket locations (i.e., at bracket 50 to support ring 60 interface), such as in a group of four or six.

As generally shown in FIG. 3, the device 200 may be connected to a remote handling pole 310 (only a portion of which is shown), during placement at each dryer support bracket 50 location. The clamping and lifting cylinders in device 200 may be connected by corresponding hydraulic lines or hoses 320L and 320C to a common manifold 330 and pump 340 for applying a positive pressure to each actuator 210 of each device 200, so as to clamp the device in place, then lift the contact plate 220 to bear against its corresponding support ring 60 lower bearing surface and hence lift the steam dryer 30 at a plurality of support bracket 50 locations. The pump 340 may include a gauge 345 to monitor lifting pressure. The pump 340 may be operated to increase pressure until at least several (such as three of four or five of the example six support ring in FIG. 3) have lifted, and the corresponding vertical displacement from each measurement device (transducer) 230 is recorded. A given measured vertical displacement represents a spacing between the steam dryer support bracket 50 and a lower bearing surface of its corresponding dryer support ring 60.

Figure 4A:
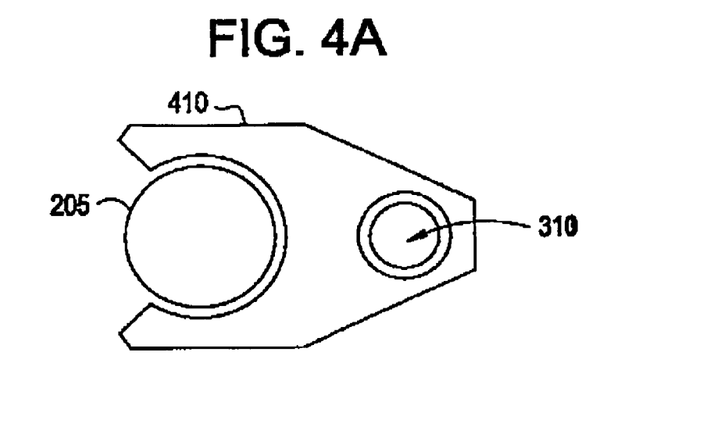
FIG. 4A is a top view illustrating an interface between the device housing 205 and handling pole 310.
Figure 4B:
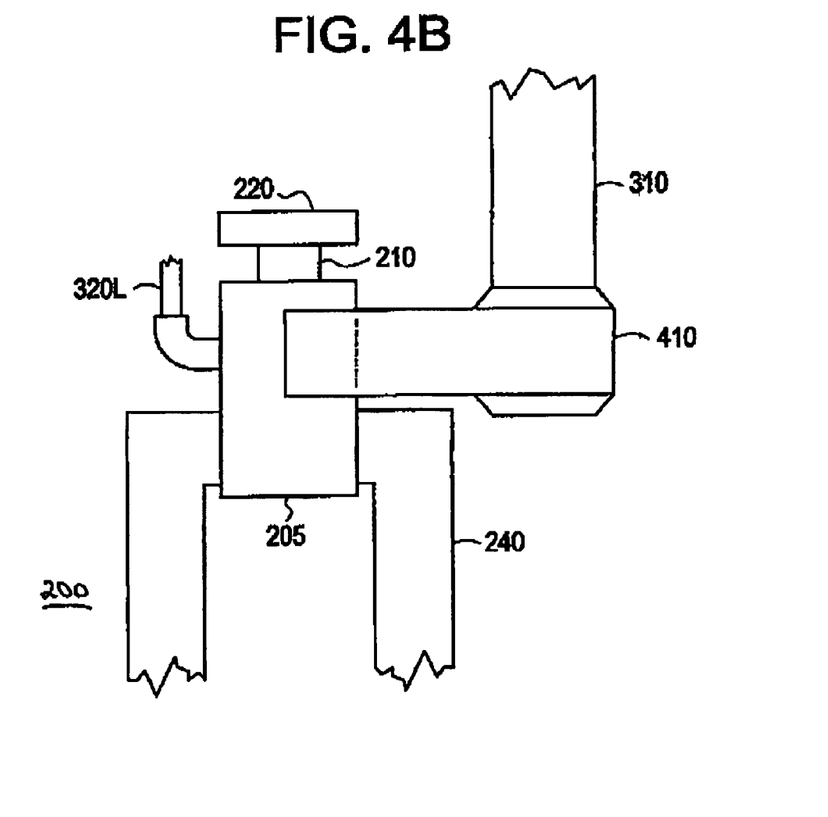
FIG. 4B is an elevational view to illustrate the interface between handing pole 310 and device 200.

FIG. 4A is a top view illustrating an interface between the device housing 205 and handling pole 310, and FIG. 4B is an elevational view to illustrate the interface between handing pole 310 and device 200. As shown in FIGS. 4A and 4B, a suitable interface such as a guide adapter 410 may be used to connect the handling pole 310 to the device 200 at housing 205, so as to position device 200 in place. The guide adapter 410 is merely exemplary; alternatively an 'L-pick" may be placed on the handling pole 310 to push device 200 in place, as is known in the art. Handling pole 310 is removed after each device 200 is clamped in place, to allow access to reinstall dryer 30 for the required measurements.

Figure 5A:
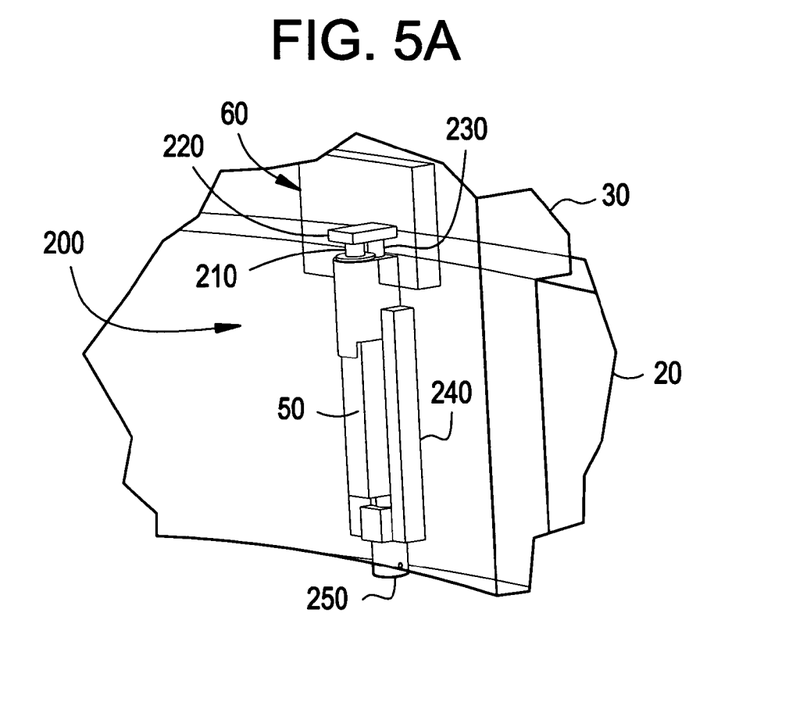
FIG. 5A is a transparent sectional view illustrating the device 200 in place between a support member 50 and the RPV upper shell 20, so as to bear against a dryer support ring 60 attached to the steam dryer 30, in accordance with an example embodiment of the present invention.
Figure 5B:
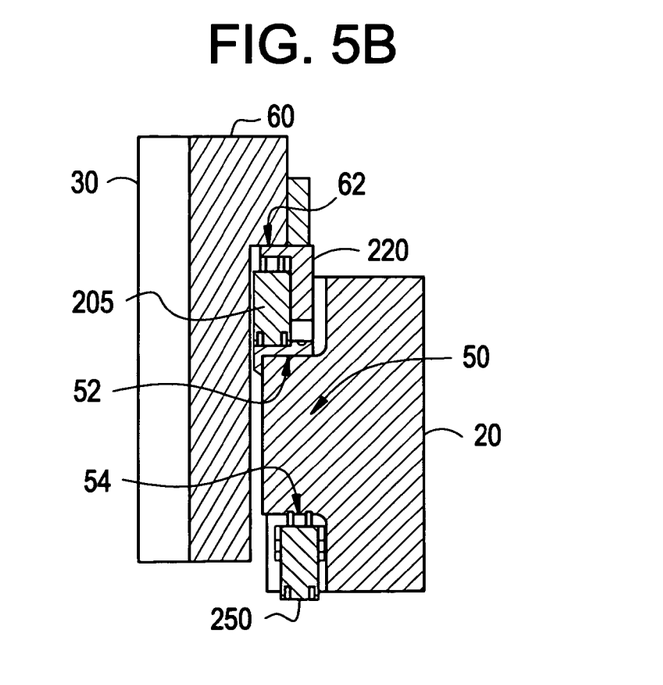
FIG. 5B is a side view illustrating the relationship between the device 200, support bracket 50, RPV upper shell 20 and support ring 60 of the steam dryer 30, in accordance with an example embodiment of the present invention.

FIG. 5A is a transparent sectional view illustrating an example device 200 in place between a support member and the RPV upper shell 20, so as to bear against a dryer support ring 60 attached to the steam dryer 30; and FIG. 5B is a side view illustrating the relationship between the device 200, support bracket 50, RPV upper shell 20 and dryer support ring 60.

As shown in FIGS. 5A and 5B, the support bracket 50, which may be fixedly attached at one end to the upper shell 20 by a weld (not shown), extends through opening 260 in device 200, such that the device housing 205 bears against an upper planar surface 52 of the support bracket 50 extending into the opening 260. The contact plate 220 bears against a corresponding dryer 30 portion (support ring 60) lower bearing surface 62. The clamping cylinder 250 bears against an underside of a lower planar surface 54 of the support bracket 50 to hold device 200 in place, fixedly securing the device 200 (i.e., actuator 210, contact plate 220 and measurement unit 230, or the lifting and measuring assembly) between the support bracket 50 and lower bearing surface 62.

Figure 6:
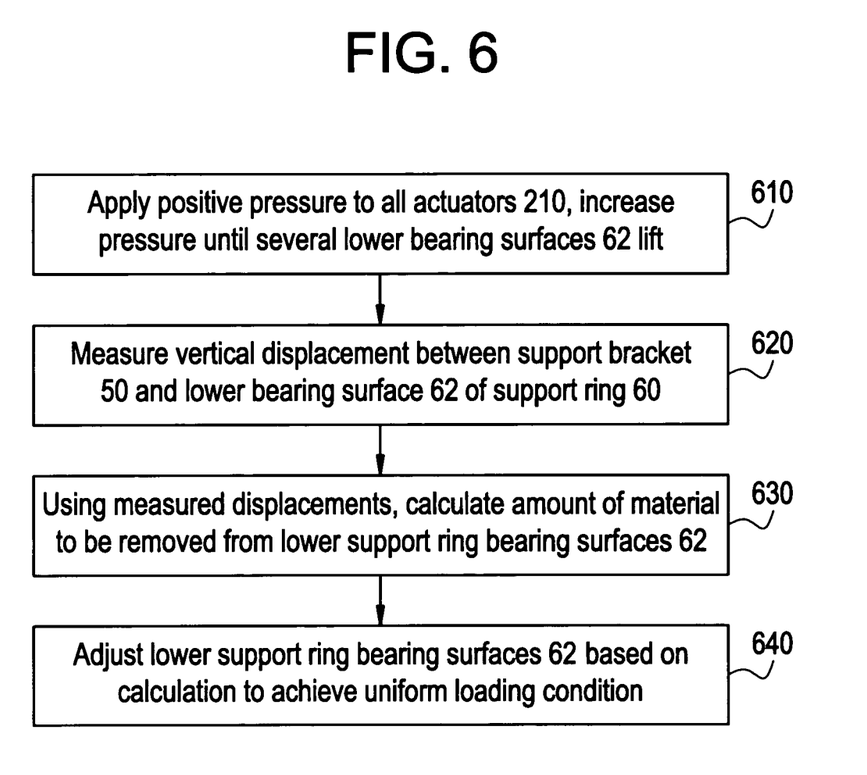
FIG. 6 is a process flow diagram for illustrating a method for facilitating a uniform loading condition for a plurality of support brackets supporting a steam dryer within a nuclear reactor, in accordance with an example embodiment of the present invention.

FIG. 6 is a process flow diagram for illustrating a method for facilitating a uniform loading condition for a plurality of support brackets supporting a steam dryer within a nuclear reactor, in accordance with an example embodiment of the present invention. In general, a vertical displacement between each of the support members and a corresponding lower bearing surface of a portion of the dryer (i.e., support ring 60) may be measured. Based on the measured displacements, one or more of the lower bearing surfaces of the dryer portions may be adjusted so as to achieve a substantially uniform loading of the dryer on the plurality of support members. In one example, each one of four support brackets are contacting a corresponding support ring bearing surface 62; in another example, each of six support brackets are contacting a corresponding support ring lower bearing surface 62.

Referring to FIG. 6, in an example method, the system shown in FIG. 3 may apply an equal positive pressure to a plurality of the lifting and measuring assemblies 200 so as to lift a plurality of the support ring bearing surfaces 62 (610). The pressure applied by pump 340 via manifold 330 and hoses 320 (which may be gradually increased) to the actuator 210 causes the actuator 210 to lift contact plate 220 against lower bearing surface 62 of the corresponding support ring, as discussed above.

The vertical displacements between each of the support brackets 50 and the corresponding lower bearing surface 62 of a lifted support ring 60 resulting from the applied pressure may be measured (620) by measurement unit 230. The measured displacements may be used to calculate (630) the amount of material to be removed from one or more of the lower bearing surfaces 62 of the support ring 60.

Based on the measured displacements, material from one or more lower bearing surfaces 62 of the support ring 60 may be adjusted (640) so as to achieve a substantially uniform loading of the dryer 30 on the plurality of support brackets 50. In an example, adjustment may be performed by grinding the lower bearing surface 62 of one or more dryer support ring 60 to remove the amount calculated (at 630) from the measured displacement value for uniform loading. Corrective machining of these lower bearing surfaces 62 or dryer contacts may be performed with the dryer 30 located in the equipment storage pool external to the RPV 10, so as not to interfere with other outage critical path maintenance. Grinding and measuring tools specifically designed for this purpose may be used, as is known in this art.

In a dryer arrangement where the dryer 30 is supported by four support brackets 50, the four brackets 50 may be arranged as a north-south pair (first pair) of brackets 50 configured in facing relation across from each other and an east-west pair (second pair) of brackets 50 in facing relation such that each of the brackets 50 are in spaced relation from one another around the support ring 60. In an example, the spacing between brackets 50 may be substantially equal.

Thus, for a dryer 30 having four support brackets 50, the two measured displacement values for the north-south pair are added, and compared to the total sum of the two measured displacements for the east-west pair. The pair with the lower sum may be subtracted from the greater pair sum and the difference divided by two. This value represents the amount or material to be removed from each of the two contact surfaces (lower bearing surfaces 62) of the support ring 60 corresponding to the support bracket 50 pair having the lower displacement sum.

Accordingly, this example method for facilitating uniform loading may avoid altering the dryer 30 alignment from its original level condition or level. Instead, if it is already known that the dryer level alignment needs to be adjusted, the total difference between the displacement sums may be removed from one of the pair of support ring 60 lower bearing surface 62 having the lower displacement sum.

In a dryer arrangement where the dryer 30 is supported by six support brackets 50, another example method may include calculating the desired trim adjustments by use of a 3D CAD layout to plot the six measured vertical displacement vectors at their respective radial and azimuthal positions, projecting upward above the horizontal plane. A "best fit plane" may be established. The best fit plane represents a best fit to the vectors by passing above, or at, the end projections of all the displacement vectors, and through as many of the displacement vector end projections as possible. The distance each of the remaining displacement vector end projections falls below the selected best fit plane may represent the amount of material to be removed from each of the corresponding support ring lower bearing surfaces 62.

Therefore, the example embodiments of the present invention provide a device and methodology which may substantially reduce the critical path schedule time to obtain the desired measurements with the dryer 30 in the RPV 10. If required to obtain the desired uniform seating, corrective machining of the dryer 30 contacts (i.e., lower bearing surfaces 62) may be performed with the dryer 30 located in the equipment storage pool external to the RPV 10, so as not to interfere with other outage critical path maintenance.

In contrast, the conventional dryer rocking test requires significant critical path schedule time to perform the rocking procedures and measurements with the dryer 30 in the RPV 10. The minor amounts of contact surface removal is not expected to have any adverse impact on the operational or safety related function of the support brackets 50 necessary for positioning the steam dryer 30. The functional features of the reactor components are not altered, and no newly-installed hardware is required.

The example embodiments of the present invention being thus described, it will be obvious that the same may be varied in many ways. Such variations are not to be regarded as departure from the spirit and scope of the example embodiments of the present invention, and all such modifications as would be obvious to one skilled in the art are intended to be included within the scope of the following claims.

What is claimed:

1. A system for facilitating a uniform loading condition for a steam dryer supported by a plurality of support members supporting a steam dryer in a nuclear reactor, comprising:
 a plurality of devices, each including,
  an actuator shaped to fit between a corresponding support member and a lower bearing surface of a portion of the dryer and configured to lift the corresponding dryer portion lower bearing surface relative to the support member,
  a measurement unit corresponding to the corresponding support member configured to measure a displacement value between the corresponding support member and the lower bearing surface of the corresponding dryer portion,
  a device housing supporting the actuator and measurement unit, and
  a pair of clamp arms connected to and extending downward from the device housing to a clamping cylinder, the clamping arms, the device housing, and the clamping cylinder defining an opening to receive the corresponding support member through the opening and to fixedly secure the device to the support member in relation to the corresponding dryer portion lower bearing surface.

2. The system of claim 1, wherein each device further includes a contact plate connected to the actuator, the contact plate configured to bear against the corresponding dryer portion lower bearing surface when connected to the actuator.

3. The system of claim 2, wherein the device housing further supports the contact plate, the device housing is configured to bear against an upper planar surface of the support member that extends into the opening, the contact plate is configured to bear against the corresponding dryer portion lower bearing surface, and the clamping cylinder is configured to bear against an underside of a lower planar surface of the support member that extends into the opening.

4. The system of claim 1, wherein the actuator is a hydraulic cylinder and the measurement unit is a transducer.

5. The system of claim 1, wherein the dryer portion lower bearing surfaces are dryer support ring bearing surfaces of the steam dryer, the dryer support ring bearing surfaces removable from the steam dryer based on the measured displacement values.

6. The system of claim 5, wherein the measured displacement value is a vertical distance between a given support member and the corresponding support ring lower bearing surface.

7. The system of claim 1, wherein the dryer portions are bearing surfaces of the dryer support ring attached to the steam dryer, and the plurality of support members are steam dryer support brackets spaced circumferentially around the steam dryer to connect a corresponding support ring to an upper shell of a reactor pressure vessel (RPV) enclosing the steam dryer.

8. The system of claim 7, wherein four of the support brackets are configured to attach to a corresponding support ring bearing area.

9. The system of claim 8, wherein the four brackets are arranged as a first pair of brackets configured in facing relation from each other and a second pair of brackets in facing relation to each other such that each of the brackets are in substantially equal spaced relation from one another at a corresponding support ring location.

10. The system of claim 7, wherein six support brackets are attached to a corresponding support ring location.

11. In a reactor pressure vessel (RPV) of a nuclear reactor, a lifting and measuring assembly connected to a plurality of support brackets supporting a steam dryer within the RPV, the assembly configured to fit between the support brackets and the dryer and configured to lift the dryer relative to the support brackets based on measuring displacement values between the support brackets and corresponding support ring bearing surfaces of the steam dryer, the assembly including a plurality of devices, each including,
 an actuator shaped to fit between a corresponding support member and a lower bearing surface of a portion of the dryer,
 a measurement unit corresponding to the corresponding support member,
 a device housing supporting the actuator and measurement unit, and
 a pair of clamp arms connected to and extending downward from the device housing to a clamping cylinder, the device housing, the pair of clamp arms, and the clamping cylinder defining an opening between the clamping arms to receive the corresponding support member through the opening so as to fixedly secure the device to the support member in relation to the corresponding dryer portion lower bearing surface.

12. The assembly of claim 11, wherein the assembly is configured so that a portion of a lower bearing surface of a support ring bearing on a corresponding support bracket is removable based on the measured displacement values.

13. The assembly of claim 12, wherein the assembly is provided at each support ring-support bracket interface in the RPV, and the measured displacement value is a vertical distance between a given support bracket and its corresponding support ring lower bearing surface.

14. The assembly of claim 11, wherein N support brackets support the steam dryer in the RPV, $N \geq 4$.

* * * * *

UNITED STATES PATENT AND TRADEMARK OFFICE
CERTIFICATE OF CORRECTION

PATENT NO.       : 8,520,794 B2
APPLICATION NO.  : 11/153342
DATED            : August 27, 2013
INVENTOR(S)      : John Geddes Erbes et al.

Page 1 of 1

It is certified that error appears in the above-identified patent and that said Letters Patent is hereby corrected as shown below:

On the title page item (75), should read:
John Geddes Erbes, Mountain View, CA;
Christopher Martin Welsh, Livermore, CA Signed and Sealed this
Seventeenth Day of December, 2013

Margaret A. Focarino
*Commissioner for Patents of the United States Patent and Trademark Office*